United States Patent [19]

Ollivier et al.

[11] 4,226,904
[45] Oct. 7, 1980

[54] POLYMETHYL METHACRYLATE-POLYVINYLIDENE FLUORIDE LAMINATES AND METHOD

[75] Inventors: Jean-Paul Ollivier, Paris; Albert Strassel, Oullins, both of France

[73] Assignee: Produits Chimiques Ugine Kuhlmann, France

[21] Appl. No.: 963,801

[22] Filed: Nov. 27, 1978

[51] Int. Cl.² .................. B32B 7/02; B32B 27/08
[52] U.S. Cl. ........................... 428/212; 156/322; 427/393.5; 428/213; 428/500; 428/515; 428/517
[58] Field of Search ............ 428/212, 213, 500, 515, 428/517, 512, 513; 427/385 B; 156/322

[56] References Cited

FOREIGN PATENT DOCUMENTS 1085818 10/1967 United Kingdom .

Primary Examiner—Thomas J. Herbert, Jr.
Attorney, Agent, or Firm—Sigalos & Levine

[57] ABSTRACT

The present invention relates to a laminate comprising a polymethyl methacrylate layer having adheringly coated on at least one surface thereof a layer of polyvinylidene fluoride having a maximum thickness one-tenth the thickness of the polymethyl methacrylate layer; the total thickness of the polyvinylidene fluoride being no greater than about 400 microns. The invention also comprises the method of making such laminates.

3 Claims, 3 Drawing Figures

POLYMETHYL METHACRYLATE-POLYVINYLIDENE FLUORIDE LAMINATES AND METHOD

BACKGROUND OF THE INVENTION

Although microcracking of the surface of polymethyl methacrylate (PMMA) articles has been the subject of considerable study, in the past it has not been possible to avoid this phenomenon which results in the appearance after aging of a certain number of small superficial cracks on the surface of the PMMA. These cracks, which can be quite deep, affect not only the appearance of the surface, but sometimes also affect the mechanical strength of the PMMA. This surface cracking is principally caused by humidity, solvents, and certain corrosive atmospheres when the PMMA is under stress. The surface cracking, which may even entail the destruction of the PMMA layer, is sometimes due to internal tensions originating from inadequate conversion of the resin leaving some of the monomer present in the polymer.

Because of this disadvantage PMMA, which otherwise possesses excellent properties such as transparency, resistance to ultraviolet rays and X-ray transmission, is not very suitable for use in certain applications where freedom from cracking and strength are important.

Efforts to eliminate this cracking while at the same time retaining the desired properties of the PMMA structure have not, heretofore, been completely successful.

SUMMARY OF THE INVENTION

According to the present invention there is provided a laminate which, while retaining the properties of PMMA, does not have the disadvantages brought about by surface cracking of the PMMA.

Briefly stated, the present invention comprises a laminate comprising a polymethyl methacrylate layer having adheringly coated on at least one surface thereof a layer of polyvinylidene fluoride having a maximum thickness one-tenth the thickness of the polymethyl methacrylate; the total thickness of the polyvinylidene fluoride layer being no greater than 400 microns. The invention also comprises the method of making such laminate as more fully set forth below.

BRIEF DESCRIPTION OF THE DRAWINGS

Referring to the drawings.

DETAILED DESCRIPTION

Figure 2:
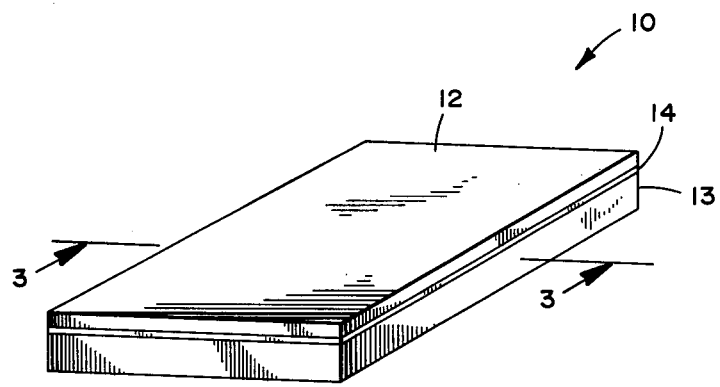
FIG. 2 is a perspective view of a laminate of the present invention.
Figure 3:
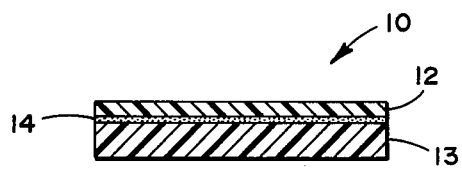
FIG. 3 is a sectional view taken along lines 3—3 of FIG. 2.

The invention will be described in connection with FIGS. 2 and 3 showing a preferred laminate (composite material) 10 comprising a layer of polyvinylidene fluoride (PVF$_2$) 12 adheringly coated onto a layer of PMMA 13 by means of intermediate adhesive bonding layer 14.

The layer of (PVF$_2$) is generally in the form of a skin or layer of film prepared by conventional processes, for example by extrusion or coating. PVF$_2$ resin is suitable for producing the coating, it being understood that this term includes homopolymers of PVF$_2$ and copolymers containing at least 70% by weight of PVF$_2$. Although PVF$_2$ is generally used in the pure state, it is permissible for fillers, pigments, plasticisers, stabilizers, and other usual ingredients to be incorporated in it. As previously noted, the PVF$_2$ layer has a maximum thickness one-tenth that of the PMMA, but in any event not greater than 400 microns; preferably no greater than 100 microns.

The PMMA which forms part of the laminate of the present invention is obtained by any known means; such as, for example, extrusion, injection, compression, or centrifugal molding. It may be of any desired thickness and in any desired shape; for example, a sheet, plate, tube, or more complex object.

In order to retain as much as possible the characteristics of PMMA it is desirable for the PVF$_2$ to be bonded to the PMMA by an adhesive bonding intermediate layer having the same optical properties as PMMA. One method of producing this composite material is described in French Application for Certificate of Addition No. 77/00.327 and comprises depositing on the PVF$_2$ surface which is to be bonded a fine film of PMMA from a solution of PMMA in an aprotic polar solvent. The PVF$_2$ is then heated at a temperature of from 100° to 250° C. for a few minutes in order to expel the solvent. After cooling, the treated PVF$_2$ surface is placed in contact with the PMMA and bonding is effected by heat sealing.

The laminate of the present invention possesses excellent resistance to aging and particularly good resistance to microcracking. The laminate of the present invention is particularly recommended for uses in which the PMMA articles need to have good resistance to aging, particularly in the medical and sanitary fields as well as for building purposes.

The invention will be further described in connection with the examples that follow which are set forth for purposes of illustration.

EXAMPLE 1

One face of a film of PVF$_2$ of a thickness of 25 microns, produced by blowing extrusion, has applied thereon a 10 weight % solution of polymethyl methacrylate of a molecular weight of about 120,000 in a 2/1 by weight mixture of dimethyl formamide and ethyl acetate by coating with a doctor blade. The film coated in this manner then being heated at 140° C. for 3 minutes.

The treated surface film of PVF$_2$ is placed in contact with a sheet of PMMA (ALTUGLAS M70 of ALTULOR) having a thickness of 3 mm, while applying a pressure of 38 kg/cm$^2$ for 2 minutes; the press plates being at a temperature of 145° C. A laminate of PMMA coated with perfectly adhering PVF$_2$ is obtained. A similar laminate is produced in the same way from a sheet of PMMA of a thickness of 4 mm, while applying a pressure of 15 kg per cm$^2$.

EXAMPLE 2

A 20 weight % solution of dry extract of PVF$_2$ in dimethyl formamide is applied with the aid of a doctor blade to a transfer paper, which is then passed continuously into an oven heated at 150° C. The residence time of the transfer paper in the oven is of the order of 3 minutes. A PVF$_2$ film of a thickness of 30 microns is thus obtained. With the aid of a second doctor blade the solution of PMMA in the mixture of dimethyl formamide and ethyl acetate of EXAMPLE 1 is applied to the PVF$_2$. The film is passed into a second oven for 3 minutes at 140° C. The film of treated PVF$_2$ is then detached from the transfer paper.

PMMA ("ALTULITE" of ALTULOR) is extruded in the form of a sheet of a thickness of 3 mm and the PVF$_2$ film is unwound and applied with its treated surface against the PMMA continuously at a temperature of 100° to 130° C. with the aid of the polishing train of the line.

It is found that the sheets of Examples 1 and 2 give the same results when subjected in the cracking tests described below.

Figure 1:
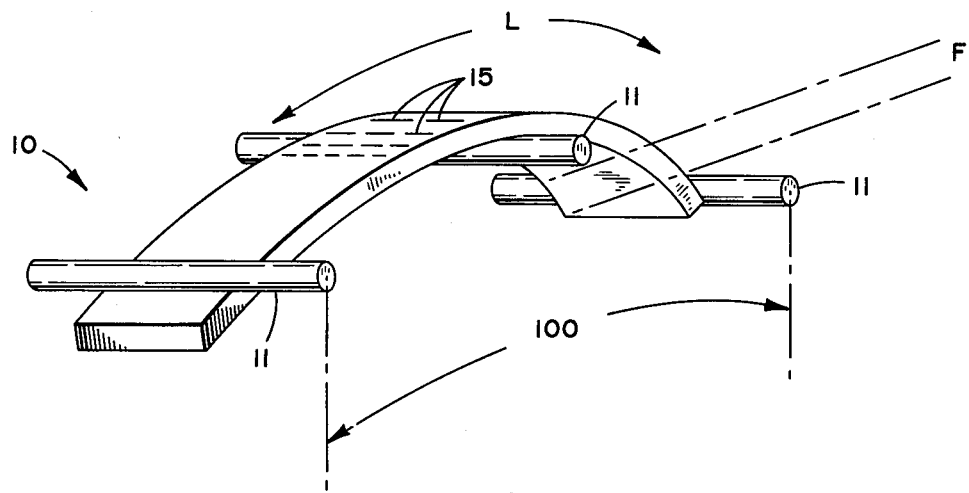
FIG. 1 is a schematic diagram of a portion of apparatus for subjecting laminates to bending stress.

Cracking is studied by subjecting test pieces of the laminates to a bending stress and the propagation of cracks is followed visually. A schematic diagram showing the test method apparatus is shown in FIG. 1 of the drawings, with the distance "F" representing the deflection and "L" the extent of the cracked zone.

Pieces of laminate 10 (20×200 mm) are subjected to static bending stressing by moving one or more of the rods 11; the PVF$_2$ being situated on the convex face of said pieces. The outermost bars as spaced 100 mm apart. The cracks 15 propagate in the direction at right angles to the heaviest stress and multiply in the direction of that stress.

In order to accelerate cracking, solvents such as chloroform, toluene, and propanol are used. They are spread over the maximum areas of stress with the aid of impregnated blotting paper of a length of 50 mm. The time taken for the cracks to appear and the size of the cracked zone after given times are measured. The results for laminates of EXAMPLES 1 and 2 and for similar sized and shaped articles made from PMMA along are shown in the following Table I:

TABLE I

| | Solvents | Deflection | Time taken for cracks to appear | Size of cracked zone L after | |
|---|---|---|---|---|---|
| | | | | 1 minute | 4 minutes |
| PMMA alone | Toluene | 5mm | −10–15 sec. | 42mm | 46mm |
| | Propanol | 5mm | −25–30 sec. | 26mm | 35mm |
| | Chloroform | 5mm | Instantaneous | 50mm | mm |
| Examples 1 and 2 | Toluene | 5mm | | No cracking | |
| | Propanol | 5mm | | No cracking | |
| | Chloroform | 5mm | | No cracking | |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A laminate comprising a polymethyl methacrylate layer having coated on at least one surface thereof a layer of a polyvinylidene fluoride having a maximum thickness one-tenth of the thickness of the polymethyl methacrylate with the thickness of the polyvinylidene fluoride coating being no greater than 400 microns and an intermediate layer having the same optical properties as polymethyl methacrylate comprising a polymethyl methacrylate layer.

2. A laminate according to claim 1, wherein the thickness of the polyvinylidene fluoride layer is no greater than 100 microns.

3. A laminate according to claim 1, wherein the intermediate adhesive layer is a film of polymethyl methacrylate formed by drying a solution of polymethyl methacrylate in an aprotic polar solvent.

* * * * *